Patented Apr. 21, 1936

2,038,512

UNITED STATES PATENT OFFICE 2,038,512

PRODUCTION OF ETHYL ALCOHOL

Robert N. Graham, South Charleston, W. Va., assignor, by mesne assignments, to Union Carbide and Carbon Corporation, a corporation of New York No Drawing. Application December 1, 1931, Serial No. 578,416

2 Claims. (Cl. 260—156)

My invention relates to the manufacture of ethyl alcohol from the acid liquor, hereinafter called ethyl sulfate liquor, produced by the absorption of ethylene in sulfuric acid, and the chief object of the invention is to provide a new method of producing ethyl alcohol from ethyl sulfate liquor which gives larger yields of alcohol than are ordinarily obtained by the known methods.

It has been customary to produce ethyl alcohol from ethyl sulfate liquor by adding the liquor slowly to cold water and thereafter boiling the resultant mixture to hydrolyze the ethyl sulfate and distill out the resultant alcohol. When this method is followed, an appreciable percentage of ethyl ether is obtained as an undesired by-product.

I have found that the percentage yield of ethyl alcohol can be increased and the yield of ether correspondingly decreased by removing the alcohol, as soon as it is formed by hydrolysis, from contact with unreacted sulfate liquor. I prefer to accomplish this result by slowly adding the sulfate liquor to boiling water, whereby the liquor is rapidly hydrolyzed and the alcohol distilled out of the water continuously, as rapidly as the sulfate liquor is added, so that at no time is there as high a concentration of ethyl sulfates or of alcohol in the hydrolysis mixture as is customarily obtained by the old process mentioned above.

I have made experiments which demonstrate the advantages of my invention. For example, 500 c. c. of crude ethyl sulfate liquor, having a specific gravity of 1.306 at 20°/20° C. and a calculated content of about 25.3% by weight of absorbed ethylene, was added continuously through a dropping funnel to 1000 c. c. of boiling water in a distillation flask provided with a water-cooled condenser. A little diethyl sulfate distilled with the water and alcohol, was separated as a lower liquid layer with the condensate and returned to the sulfate liquor. 2.02% of the estimated ethylene content of the ethyl sulfate liquor used formed ethyl ether, and was so present in the distillate. Samples of ethyl sulfate liquor having the same composition as that used above were hydrolyzed by the commonly used method, that is, the liquor was added slowly to cold water and then heated and distilled. This second procedure yielded an amount of ether equivalent to that which would be formed from 3.92% of the calculated ethylene content of the ethyl sulfate liquor used, with a corresponding loss of alcohol.

It will be apparent that I should not be limited by the illustrative example given herein, but to the broad principle of my invention as defined by the accompanying claims.

I claim:

1. Continuous process of hydrolyzing ethyl sulfates wherein ethyl sulfates are continuously added to, and ethyl alcohol continuously distilled from, boiling water at such a rate that at no time is there a high concentration in the hydrolysis mixture of either the ethyl sulfates or the ethyl alcohol, and any diethyl sulfate removed with the alcohol distillate is continuously separated from said distillate and returned to the hydrolysis mixture.

2. Continuous process of hydrolyzing ethyl sulfates wherein ethyl sulfates are continuously added to, and ethyl alcohol continuously distilled from, boiling water at such a rate that at no time is there a high concentration in the hydrolysis mixture of either the ethyl sulfates or the ethyl alcohol, and in which any diethyl sulfate distilling with the alcohol is continuously separated therefrom by gravity as a lower liquid layer and returned to the hydrolysis mixture.

ROBERT N. GRAHAM.